United States Patent [19]

Mitani

[11] Patent Number: 5,173,787
[45] Date of Patent: Dec. 22, 1992

[54] METHOD FOR STORING IMAGE SIGNALS
[75] Inventor: Yasushi Mitani, Kanagawa, Japan
[73] Assignee: Fuji Photo Film Co., Ltd., Kanagawa, Japan
[21] Appl. No.: 666,114
[22] Filed: Mar. 6, 1991

[30] Foreign Application Priority Data

Mar. 7, 1990 [JP] Japan ................................. 2-55864
Mar. 7, 1990 [JP] Japan ................................. 2-55865

[51] Int. Cl.$^5$ ................................. H04N 1/40
[52] U.S. Cl. ................................. 358/433; 358/133; 358/428; 250/327.2
[58] Field of Search ............ 358/433, 426, 429, 261.1, 358/261.2, 261.3, 261.4, 262.1, 262.2, 443, 133, 428; 382/56, 6; 250/327.2 A, 327.2 B, 327.2 C, 327.2 D, 327.2 E, 327.2 F, 327.2 G, 327.2 H, 327.2 I, 327.2 J, 327.2 K, 327.2 L

[56] References Cited

U.S. PATENT DOCUMENTS

| 4,903,124 | 2/1990 | Hoshi et al. ........................ 358/133 |
| 4,922,510 | 5/1990 | Brusewitz ........................... 358/133 |
| 5,001,575 | 3/1991 | Nakahara ............................ 358/428 |
| 5,023,715 | 6/1991 | Owada et al. ........................ 358/133 |
| 5,060,081 | 10/1991 | Shimura ............................ 358/443 |

FOREIGN PATENT DOCUMENTS 0082219 7/1978 Japan ................................. 358/428
0018617 2/1979 Japan ................................. 358/428

Primary Examiner—Edward L. Coles, Sr.
Assistant Examiner—Grant, I220101me
Attorney, Agent, or Firm—Sughrue, Mion, Zinn, Macpeak & Seas

[57] ABSTRACT

Image signal components of an image signal, which have been detected by scanning an image in main scanning and sub-scanning directions and represent picture elements in the image, are classified into blocks each of which is composed of the image signal components representing the picture elements arrayed along at least a single main scanning line. For each block, primary compressed image signal components are generated from the image signal components corresponding to each block, and secondary compressed image signal components are generated from the primary compressed image signal components and the image signal components corresponding to each block. Control codes are attached at least to an edge of a series of the primary compressed image signal components, which correspond to each block, and to an edge of the corresponding series of the secondary compressed image signal components. The control codes represent that the series of the primary compressed image signal components and the series of the secondary compressed image signal components correspond to each other. An array of the series of the primary compressed image signal components corresponding to the whole image and an array of the series of the secondary compressed image signal components corresponding to the whole image are stored independently of each other.

12 Claims, 6 Drawing Sheets

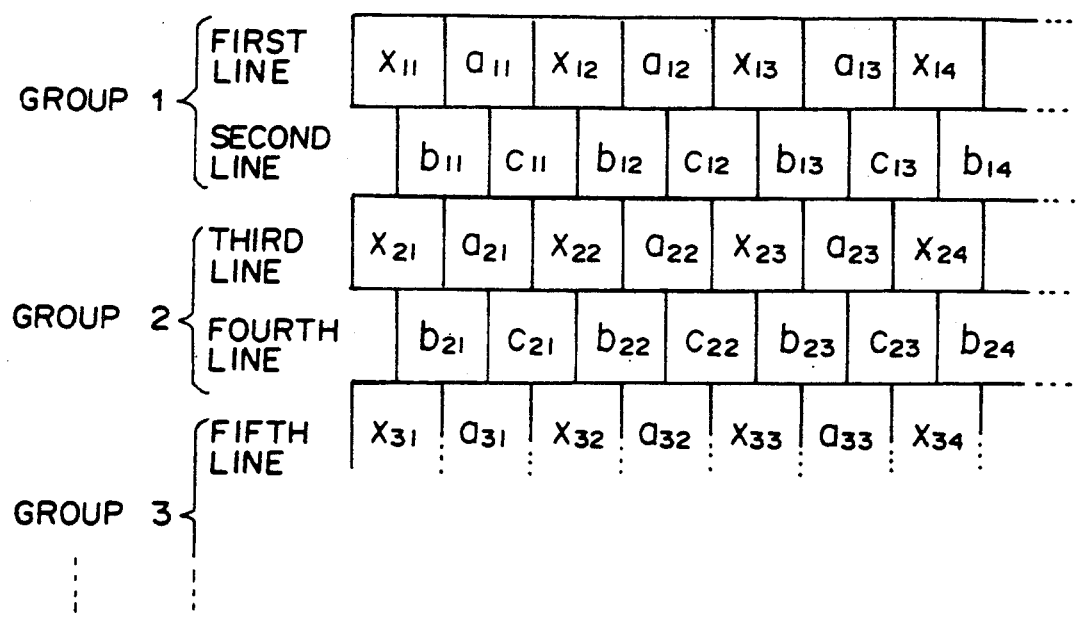

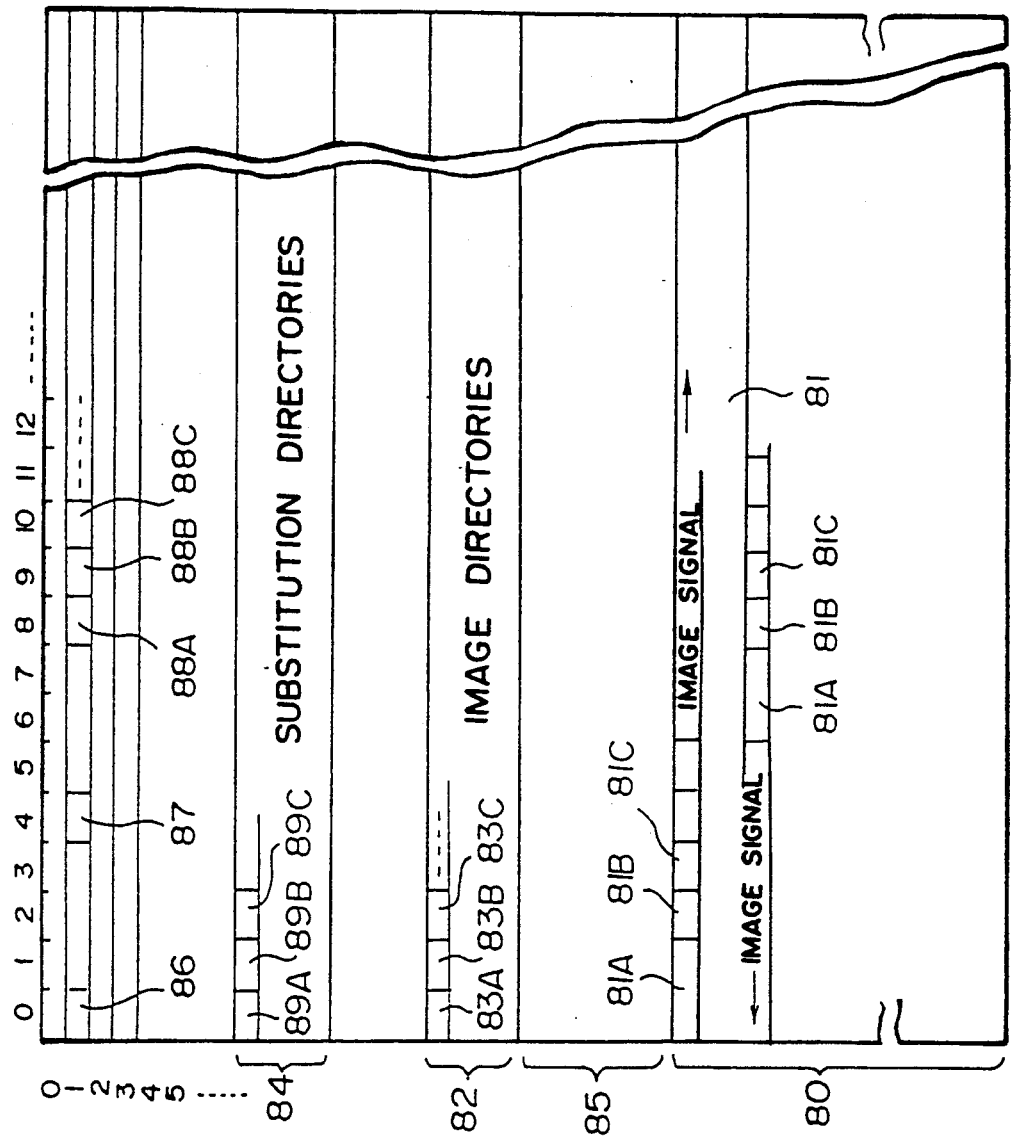

FIG.8A SOL [0 0 0) 0 0 1 0 GROUP NO.]

FIG.8B EOL [0 0 0) 0 0 1 1 0 0 0 0 0]

FIG.8C SOP [0 0 0) 0 0 1 1 0 1 0 0 0]

FIG.8D EOP [0 0 0) 0 0 1 1 1 0 0 0 0]

17 BITS SET TO 0

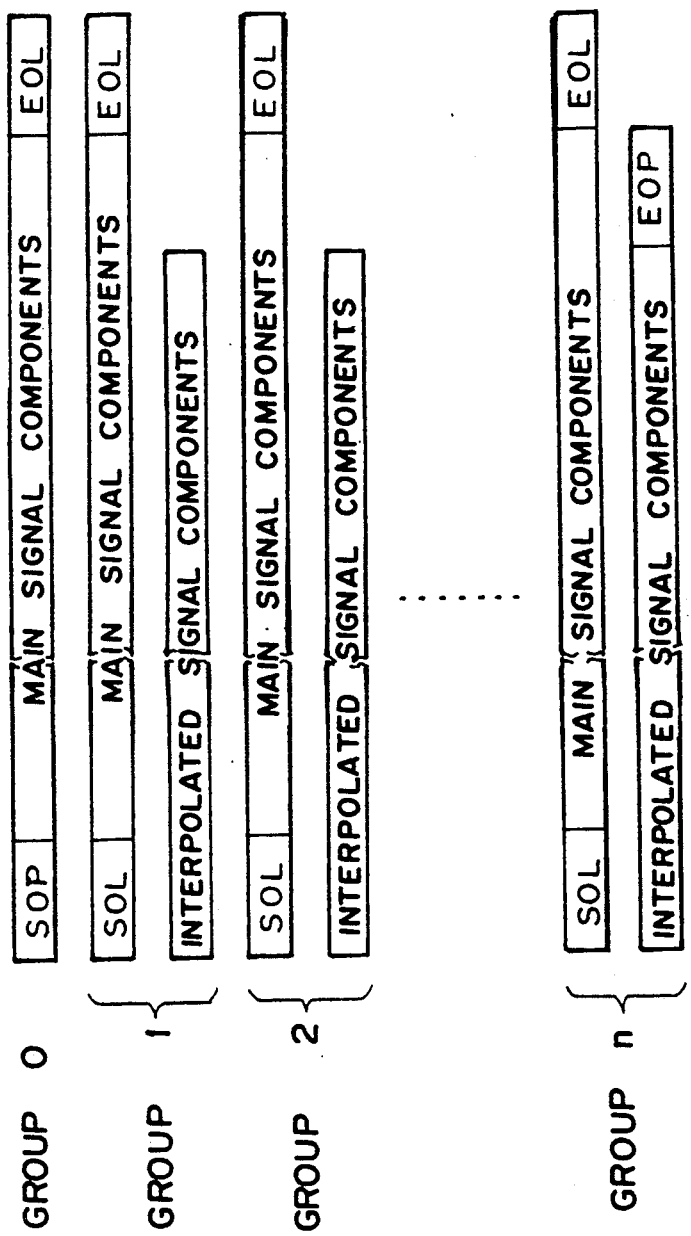

METHOD FOR STORING IMAGE SIGNALS

BACKGROUND OF THE INVENTION

1. Field of the Invention

This invention relates to a method for storing an image signal, wherein an image signal, which has been generated by scanning an image in a main scanning direction and a sub-scanning direction and is made up of a series of image signal components, is stored on a storage medium, such as an optical disk.

2. Description of the Prior Art

Storing a plurality of images, picking a certain image out of the plurality of the images, and using it have heretofore been carried out in various fields. For example, at medical facilities, such as hospitals, many kinds of medical images are utilized for medical treatment or research. Most of the medical images are X-ray images. In recent years, many computed tomography (CT) images, magnetic resonance (MR) images, and the like, are also utilized.

The medical images should be stored to permit investigation of changes in diseases or injuries of patients, and it is legally stipulated that the medical images must be stored for a predetermined period. Therefore, in hospitals, or the like, the number of stored medical images increases daily.

The medical images have heretofore been stored in the form of hard copies. However, storage as hard copies requires a large storage space and burdensome operations for control and retrieval of the medical images in hospitals, or the like.

Accordingly, in recent years, an image filing apparatus has been proposed in which images, such as medical images, are retrievably stored (i.e. filed) as image signals on a storage medium. In cases where the medical images are filed in this manner on the storage medium, the space requirement and the burden of image storage can be reduced, and the images can be retrieved easily and quickly.

In the image filing apparatus, image signals are stored on a storage medium, such as an optical disk, which has a very large storage capacity. However, even an image signal representing a single image requires a considerable storage capacity. Therefore, in general, image signals are compressed, and the resulting compressed image signals are stored on the storage medium.

Various processes have heretofore been proposed to compress image signals. One example of such processes is the so-called interpolation encoding process. With the interpolation encoding process, image signal components of an image signal, which represent a plurality of picture elements in an image, are sampled at appropriate sampling intervals, e.g. alternately. The image signal components, which have thus been sampled, are employed as main image signal components. As for each of the remaining picture elements other than the picture elements, which are represented by the main image signal components, a calculation is made to find the difference between a value, which has been interpolated from the main image signal components representing the picture elements neighboring with each remaining picture element, and the actual value of the image signal component representing each said remaining picture element. In this manner, interpolated image signal components representing the differences, which have thus been calculated, are generated for the remaining picture elements. Thereafter, the main image signal components and the interpolated image signal components are subjected to compression processing, and are stored in the compressed form on a storage medium.

Also, retrieval information giving specifics about each image is entered into the image filing apparatus together with the image signal representing the image. A data base is constructed from the retrieval information corresponding to a plurality of image signals and is used during the retrieval of the image signals.

When the original image signal representing the image is to be restored, the main image signal components, which have been compressed, are subjected to decompression processing, which corresponds to the reversed operation of the compression processing. In this manner, the main image signal components, which have not been compressed, are restored. Also, the interpolated image signal components, which have been compressed, are subjected to decompression processing, which corresponds to the reversed operation of the compression processing. Thereafter, the values of the image signal components representing the picture elements other than the picture elements, which are represented by the main image signal components, are calculated from the values of the interpolated image signal components, which have thus been decompressed, and the values of the restored main image signal components. The image signal components representing the picture elements other than the picture elements, which are represented by the main image signal components, are thus restored and then combined with the restored main image signal components. In this manner, the original image signal representing the image is restored.

In the image filing apparatus described above, in the course of retrieving and reading a compressed image signal from the storage medium, such as an optical disk, if the storage medium has a defective part, the compressed image signal components (the main image signal components or the interpolated image signal components, which have been compressed) will not be read out normally. As a result, part of the compressed image signal components, which have thus been read out of the storage medium, will be destroyed.

As described above, with the interpolation encoding technique, an image signal representing a single image is divided into the main image signal components and the interpolated image signal components, and the main image signal components and the interpolated image signal components are then compressed. Therefore, in cases where the compressed image signal components read from the storage medium are ones which have been compressed with the interpolation encoding technique, if part of the compressed image signal components (the main image signal components or the interpolated image signal components, which have been compressed) is destroyed, it will become impossible to find how the main image signal components and the interpolated image signal components are associated with each other. In such cases, the destroyed part of the compressed image signal components and part thereof following the destroyed part cannot be restored.

SUMMARY OF THE INVENTION

The primary object of the present invention is to provide a method for storing an image signal, wherein an image signal representing a single image is divided into main image signal components and interpolated image signal components, the main image signal components and the interpolated image signal components are then compressed, and the compressed image signal components are stored on a storage medium such that, even if part of the compressed image signal components which are read from the storage medium, is destroyed, it can be found accurately how the main image signal components and the interpolated image signal components are associated with each other.

Another object of the present invention is to provide a method for storing an image signal such that, even if part of an image signal representing an image is destroyed, the image can be restored, except for a small image region corresponding to the destroyed part of the image signal.

The present invention provides a first method for storing an image signal, which comprises the steps of:

i) classifying a series of image signal components of an image signal, which have been detected by scanning an image in a main scanning direction and a sub-scanning direction and represent a plurality of picture elements in the image, into a plurality of blocks each of which is composed of the image signal components representing the picture elements arrayed along a single main scanning line or a plurality of main scanning lines, ii) for each of the plurality of the blocks, generating the primary compressed image signal components, which are obtained from the image signal components corresponding to each block, and secondary compressed image signal components, which are obtained from the primary compressed image signal components and the image signal components corresponding to each block, and iii) storing the primary compressed image signal components and the secondary compressed image signal components, which have been generated for the plurality of the blocks, on a storage medium, wherein the improvement comprises the steps of:

a) attaching the control codes at least to an edge of a series of the primary compressed image signal components, which correspond to each said block, and to an edge of a series of the secondary compressed image signal components, which correspond to the series of said primary compressed image signal components, said control codes representing that the series of said primary compressed image signal components and the series of said secondary compressed image signal components correspond to each other, and b) storing an array of a plurality of series of the primary compressed image signal components, which correspond to the whole image, and an array of a plurality of series of the secondary compressed image signal components, which correspond to the whole image, independently of each other.

The term "primary compressed image signal components" and the term "secondary compressed image signal components" as used herein typically mean the main image signal components and the interpolated image signal components, which are generated during an interpolation encoding process. However, the primary compressed image signal components and the secondary compressed image signal components are not limited to the main image signal components and the interpolated image signal components. Specifically, compressed image signal components, which are obtained only from the original image signal components, are referred to as the primary compressed image signal components. Also, compressed image signal components, which are obtained from the original image signal components and the primary compressed image signal components, are referred to as the secondary compressed image signal components.

Control codes, which represent that a series of the primary compressed image signal components and a series of the secondary compressed image signal components correspond to each other, are attached at least to an edge of a series of the primary compressed image signal components which correspond to each block, and to an edge of a series of the secondary compressed image signal components, which correspond to the series of said primary compressed image signal components. Specifically, the control codes are attached to the top and/or the end of a series of the primary compressed image signal components, which correspond to each block, and to the top and/or the end of a series of the secondary compressed image signal components, which correspond to each block. By way of example, in order for double checking to be effected, control codes may be attached to both the top and the end of a series of the primary compressed image signal components, which correspond to each block, and to both the top and the end of a series of the secondary compressed image signal components, which correspond to each block.

The control codes, which represent that a series of the primary compressed image signal components and a series of the secondary compressed image signal components correspond to each other, may be attached to the top of a series of the primary compressed image signal components, which correspond to each block, and to the top of a series of the secondary compressed image signal components, which correspond to the series of said primary compressed image signal components. Additionally, other control codes, which represent that a series of the primary compressed image signal components and a series of the secondary compressed image signal components terminate, may be attached to the end of the series of the primary compressed image signal components and to the end of the series of the secondary compressed image signal components. Also, other control codes, which represent that the primary compressed image signal components corresponding to the whole image and the secondary compressed image signal components corresponding to the whole image start, may be attached to the top of such primary compressed image signal components and to the top of such secondary compressed image signal components. Moreover, other control codes, which represent that the primary compressed image signal components corresponding to the whole image and the secondary compressed image signal components corresponding to the whole image terminate, may be attached to the end of such primary compressed image signal components and to the end of such secondary compressed image signal components.

With the first method for storing an image signal in accordance with the present invention, control codes, which represent that a series of the primary compressed image signal components and a series of the secondary compressed image signal components correspond to each other, are attached at least to an edge of a series of the primary compressed image signal components, which correspond to each block, and to an edge of a series of the secondary compressed image signal components, which correspond to the series of said primary compressed image signal components. Therefore, even if part of the compressed image signal components is destroyed or a plurality of parts of the compressed image signal components are destroyed, it can be found accurately how the main image signal components and the interpolated image signal components are associated with each other. Accordingly, even if part of the image signal representing an image is destroyed, the image can be restored, except for a small image region corresponding to the destroyed part of the image signal.

The present invention also provides a second method for storing an image signal, which comprises the steps of:

i) classifying a series of image signal components of an image signal, which have been detected by scanning an image in a main scanning direction and a sub-scanning direction and represent a plurality of picture elements in the image, into a plurality of blocks each of which is composed of the image signal components representing the picture elements arrayed along a single main scanning line or a plurality of main scanning lines, ii) for each of the plurality of the blocks, generating the primary compressed image signal components, which are obtained from the image signal components corresponding to each block, and secondary compressed image signal components, which are obtained from the primary compressed image signal components and the image signal components corresponding to each block, and iii) storing the primary compressed image signal components and the secondary compressed image signal components, which have been generated for the plurality of the blocks, on a storage medium, wherein the improvement comprises the steps of:

a) attaching a first control code to the top of a series of the primary compressed image signal components, which correspond to each said block, said first control code being used to discriminate the series of said primary compressed image signal components from other series of the primary compressed image signal components, b) attaching a second control code to the end of a series of the primary compressed image signal components, which correspond to each said block, said second control code representing that the series of said primary compressed image signal components, which correspond to each said block, terminate, and c) storing the primary compressed image signal components and the secondary compressed image signal components on the storage medium such that a series of the secondary compressed image signal components, which correspond to a series of the primary compressed image signal components recorded immediately before a second control code, are located after said second control code.

The term "primary compressed image signal components" and the term "secondary compressed image signal components" as used herein for the second method for storing an image signal in accordance with the present invention have the same meanings as those described above with reference to the first method for storing an image signal in accordance with the present invention.

A first control code and a second control code are attached to the top and the end of a series of the primary compressed image signal components, which correspond to each block. Additionally, a different control code, which represents that the compressed image signal components corresponding to the whole image start, may be attached to the top of the compressed image signal components. Also, a different control code, which represents that the compressed image signal components corresponding to the whole image terminate, may be attached to the end of the compressed image signal components.

In the second method for storing an image signal in accordance with the present invention, all of the compressed image signal components corresponding to a single image need not necessarily be arrayed in the manner described above. For example, compressed image signal components, which are arrayed in a way different from the array in the second method for storing an image signal in accordance with the present invention, may be located at the top part, the end part, or the like, of a plurality of the compressed image signal components corresponding to a single image.

With the second method for storing an image signal in accordance with the present invention, the first control code is attached to to the top of a series of the primary compressed image signal components, which correspond to each block. The first control code is used to discriminate the series of the primary compressed image signal components from other series of the primary compressed image signal components. Also, a series of the primary compressed image signal components and a series of the secondary compressed image signal components, which correspond to each other, are located close to each other with the second control code intervening therebetween. Therefore, even if part of the compressed image signal components corresponding to a block is destroyed, it can be found accurately how the main image signal components and the interpolated image signal components, which correspond to the other blocks, are associated with each other. Also, it can be found accurately to which block the main image signal components and the interpolated image signal components belong. Accordingly, even if part of the image signal representing an image is destroyed, the image can be restored, except for a small image region corresponding to the destroyed part of the image signal.

BRIEF DESCRIPTION OF THE DRAWINGS

FIG. 2 is an explanatory view showing how picture elements in an image are arrayed, FIGS. 4A, 4B, 4C, and 4D are explanatory views showing the bit strings, which constitutes codes attached to the tops or ends of a plurality of series of main image signal components and a plurality of series of interpolated image signal components in the embodiment of the first method for storing an image signal in accordance with the present invention, FIG. 5 is an explanatory view showing the recording format on an optical disk, FIG. 7 is an explanatory view showing how a plurality of series of main image signal components and a plurality of series of interpolated image signal components are arrayed in an embodiment of the second method for storing an image signal in accordance with the present invention, and FIGS. 8A, 8B, 8C, and 8D are explanatory views showing the bit strings, which constitutes codes attached to the tops and ends of a plurality of series of main image signal components and the end of a last series of interpolated image signal components in the embodiment of the second method for storing an image signal in accordance with the present invention.

DESCRIPTION OF THE PREFERRED EMBODIMENTS

The present invention will hereinbelow be described in further detail with reference to the accompanying drawings.

Figure 1:
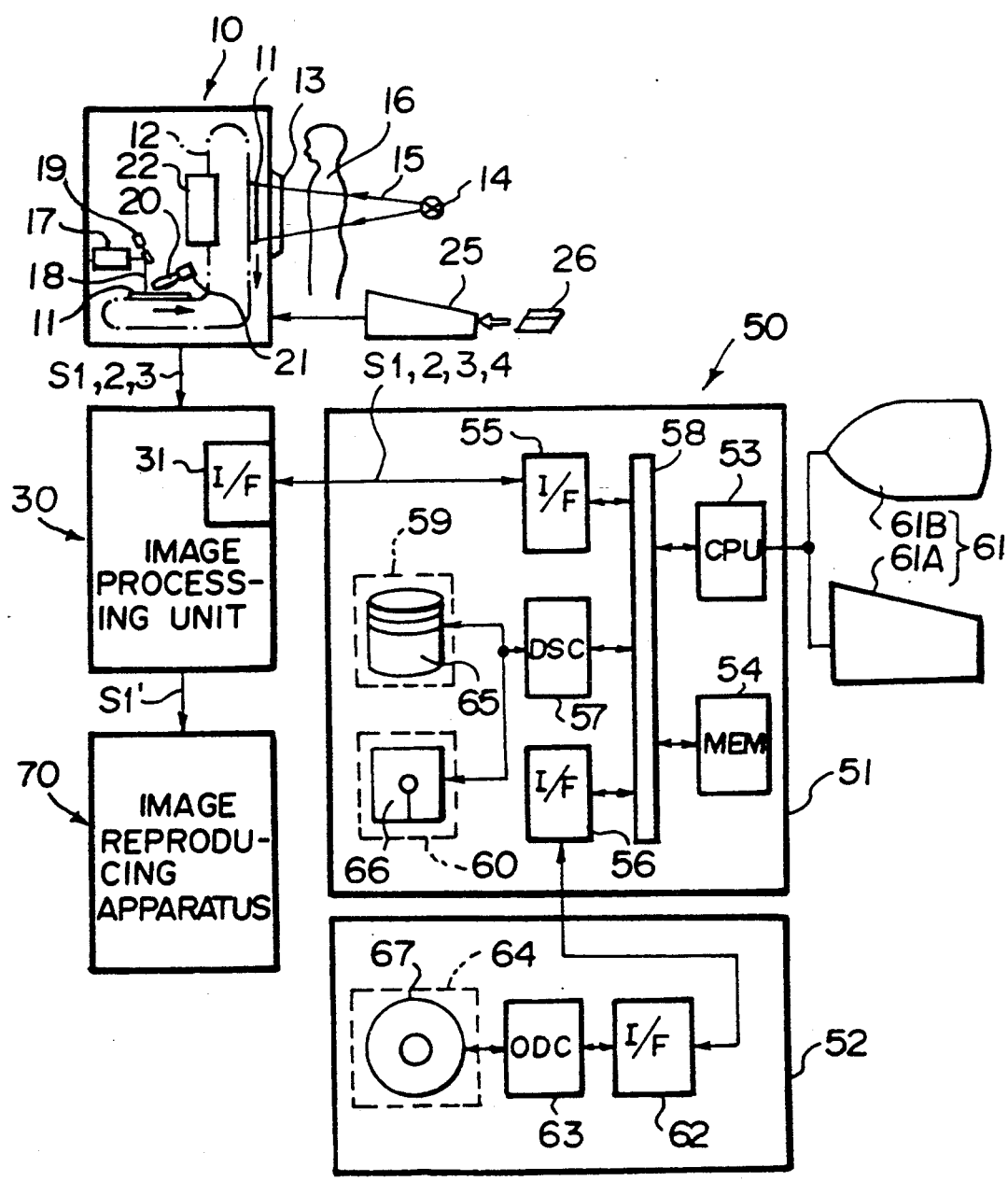
FIG. 1 is a schematic view showing an example of an image read-out, filing, and reproducing system, wherein an embodiment of the first method for storing an image signal in accordance with the present invention is employed.

FIG. 1 is a schematic view showing an example of an image read-out, filing, and reproducing system, wherein an embodiment of the first method for storing an image signal in accordance with the present invention is employed.

Referring to FIG. 1, an image filing apparatus 50 is constituted of a system control device 51, and an optical disk device 52, with which signals are stored on an optical disk 67 and are read therefrom. The image filing apparatus 50 also comprises an operating console 61 consisting of a keyboard 61A and a display unit 61B. The display unit 61B may be constituted of a cathode ray tube (CRT) display device, or the like. The image filing apparatus 50 is connected to an image processing unit 30. The image processing unit 30 receives an image signal S1 from a radiation image recording and read-out apparatus 10, which constitutes an example of an image signal source. The image processing unit 30 carries out predetermined image processing on the image signal S1, and sends an image signal S1', which has been obtained from the image processing, to an image reproducing apparatus 70.

The radiation image recording and read-out apparatus 10 may be of the type disclosed in, for example, U.S. patent application Ser. No. 755,992 or U.S. Pat. No. 4,705,953. In the radiation image recording and read-out apparatus 10, stimulable phosphor sheets 11, 11 are conveyed and circulated along a circulation path 12. A stimulable phosphor sheet 11 is stopped at the position facing an image recording stand 13 and is exposed to radiation 15, which is produced by a radiation source 14 and which has passed through an object (patient) 16. In this manner, a radiation image of the object 16 is stored on the stimulable phosphor sheet 11. The stimulable phosphor sheet 11, on which the radiation image has been stored, is conveyed to an image read-out section. At the image read-out section, the stimulable phosphor sheet 11, on which the radiation image has been stored, is scanned in a main scanning direction with a laser beam 18, which is produced by a laser beam source 17 and deflected by a light deflector 19. At the same time, the stimulable phosphor sheet 11, on which the radiation image has been stored, is moved in a subscanning direction, which is approximately normal to the main scanning direction. In this manner, the stimulable phosphor sheet 11, on which the radiation image has been stored, is two-dimensionally scanned with the laser beam 18. The laser beam 18 serves as stimulating rays. As the stimulable phosphor sheet 11 is exposed to the laser beam 18, the exposed portion of the sheet 11 emits light in proportion to the amount of energy stored thereon during its exposure to the radiation 15. The emitted light is photoelectrically detected by a photodetector 21, which is constituted of a photomultiplier or the like, via a light guide member 20. An analog output signal generated by the photodetector 21 is amplified and converted into a digital image signal S1. The digital image signal S1, which is thus obtained and which represents the radiation image of the object 16, is fed out of the radiation image recording and read-out apparatus 10. After the image read-out operation is finished in this manner, the stimulable phosphor sheet 11 is sent to an erasing section 22. At the erasing section 22, the stimulable phosphor sheet 11 is exposed to erasing light, and any energy remaining on the sheet 11 is erased to such an extent that the sheet 11 may be reused for the recording of a radiation image.

The radiation image recording and read-out apparatus 10 is connected to an ID terminal 25. At the ID terminal 25, information written on an ID card 26 for the patient 16 (hereinafter referred to as patient information) is read out. The patient information includes, for example, the name, the sex, and the date of birth of the patient. Also, information about characteristics of the recorded radiation image (hereinafter referred to as image characteristics information) is entered at the ID terminal 25. The image characteristics information includes, for example, the image number, the date on which the image was recorded, the portion of the object the image of which was recorded, the size of the recorded image, and the sensitivity with which the image is read out. The patient information S2 and the image characteristics information S3 are fed to the image processing unit 30 together with the image signal S1. The patient information S2, the image characteristics information S3, and other accompanying information are utilized as retrieval information, and an example of a image retrieval data base is constituted of the retrieval information.

The image processing unit 30 can carry out, for example, at least 20 types of gradation processes and at least 10 types of frequency response processes on the digital image signal S1. The image processing conditions are tabulated, and optimal image processing conditions are automatically selected from the table in accordance with the characteristics of the recorded radiation image, which are designated at the ID terminal 25. The image signal S1', which is obtained by carrying out image processing under optimal conditions in the image processing unit 30, is sent to the image reproducing apparatus 70.

By way of example, the image reproducing apparatus 70 is composed of a CRT display device, which reproduces a visible image from the image signal S1' and displays it. The visible image displayed on the CRT screen is utilized for making a diagnosis of the patient 16. Instead of being constituted of the CRT display device, the image reproducing apparatus 70 may be constituted of a laser printer, or the like.

How an image signal representing a radiation image is stored (filed) by the image filing apparatus 50 will be described hereinbelow.

The system control device 51 of the image filing apparatus 50 is constituted of a known computer system. Specifically, the system control device 51 is composed of a central processing unit (CPU) 53, a memory 54, interfaces 55 and 56, a control unit 57, a bus 58 which connects these sections, a fixed magnetic disk drive unit 59, and a floppy disk drive unit 60. The control unit 57 controls the fixed magnetic disk drive unit 59 and the floppy disk drive unit 60. The aforesaid keyboard 61A and the display unit 61B are connected to the CPU 53, and the interface 55 is connected to an interface 31 of the image processing unit 30. The optical disk device 52 is composed of an interface 62, which is connected to the interface 56 of the system control device 51, an optical disk drive control unit 63, and an optical disk drive unit 64. The optical disk 67 is inserted into the optical disk drive unit 64.

The retrieval information, such as the aforesaid patient information S2 and the image characteristics information S3, is transferred from the image processing unit 30 to the system control device 51, and recorded on the fixed magnetic disk 65, which is operated by the fixed magnetic disk drive unit 59. In this manner, a data base is constructed on the fixed magnetic disk 65 from the retrieval information. The retrieval information, such as the patient information S2 and the image recording information S3, is also transferred to the optical disk device 52, and filed on the optical disk 67 together with a compressed image signal S5, which is transferred from the image processing unit 30. The compressed image signal S5 is obtained from signal compression processing, which is carried out on the image signal S1 in the image processing unit 30 before the image signal S1 is subjected to the aforesaid image processing. Also, information S4 about the image processing conditions, under which the image signal S1 is to be processed and the image signal S1' is to be generated, is fed out of the image processing unit 30 and stored on the optical disk 67.

How the image signal S1 is compressed in the image processing unit 30 will be described hereinbelow.

FIG. 2 is an explanatory view showing how picture elements in an image are arrayed. As an aid in facilitating the explanation, reference characters xij, aij, bij, and cij, where i, j = 1, 2, ..., are used herein to denote both the picture elements and the image signal components representing the picture elements.

With reference to FIG. 2, each line constituted of a row of the picture elements corresponds to each main scanning line of the laser beam 18, which is deflected by the light deflector 19 shown in FIG. 1. The picture elements arrayed along even-numbered lines and the picture elements arrayed along odd-numbered lines are shifted horizontally by a length equal to one-half of the length of a single picture element. Such shifting is effected by adjusting the timing, with which the image signal is sampled during the image read-out operation, or by carrying out interpolating operations, or the like, after the image read-out operation. As illustrated, every two lines are combined into a single group. In this embodiment, the groups correspond to the blocks in the first method for storing an image signal in accordance with the present invention.

The image signal components representing the picture elements arrayed along the odd-numbered lines are sampled alternately. The image signal components xij, where i, j = 1, 2, ..., which have thus been sampled, are employed as main image signal components. Also, in the manner described below, interpolated image signal components are generated from the image signal components representing the remaining picture elements aij, bij, and cij, where i, j = 1, 2, ...

Specifically, interpolated values (predicted values) aij', bij', and cij', where i, j = 1, 2, ..., which correspond to the image signal components aij, bij, and cij, where i, j = 1, 2, ..., are calculated from the values of the main image signal components xij, where i, j = 1, 2, ... The calculations are carried out with the formulas $$aij' = (xij + xi,j+1)/2 \qquad (1)$$

$$bij' = (2.xij + xi,j+1 + 2.xi+1,j + xi+1,j+1)/6) \qquad (2)$$

$$cij' = (xij + 2.xi,j+1 + xi+1,j + 2.xi+1,j+1)/6 \qquad (3)$$

Thereafter, calculations are made to find the values of differences between the interpolated values aij', bij', and cij', where i, j = 1, 2, ..., and the actual values of the corresponding image signal components aij, bij, and cij, where i, j = 1, 2, ... In this manner, difference image signal components $\Delta aij$, $\Delta bij$, and $\Delta cij$, where i, j = 1, 2, ..., are generated which represent the values of the differences thus calculated. The calculations are carried out with the formulas $$\Delta aij = aij - aij' \qquad (4)$$

$$\Delta bij = bij - bij' \qquad (5)$$

$$\Delta cij = cij - cij' \qquad (6)$$

The values of the difference image signal components $\Delta aij$, $\Delta bij$, and $\Delta cij$, where i, j = 1, 2, ..., are transformed into Huffman codes in accordance with, for example, a Huffman code table shown in Table 1. With the Huffman code table shown in Table 1, a value closer to zero is transformed into a shorter code. In many cases, the interpolated values aij', bij', and cij', where i, j = 1, 2, ..., which have been calculated from the values of the main image signal components xij, where i, j = 1, 2, ..., with Formulas (1), (2), and (3), and the actual values of the corresponding image signal components aij, bij, and cij, where i, j = 1, 2, ... are close to each other. Therefore, by calculating the values of the differences between the interpolated values aij', bij', and cij', where i, j = 1, 2, ..., and the actual values of the corresponding image signal components aij, bij, and cij, where i, j = 1, 2, ..., in the manner described above and transforming the values of the differences into the Huffman codes, the amount of the signal can be reduced even further. The difference image signal components $\Delta aij$, $\Delta bij$, and $\Delta cij$, where i, j = 1, 2, ..., which correspond to each group and have been encoded into the Huffman codes, are employed as a series of interpolated image signal components.

TABLE 1

| Dif. value | Code |
|---|---|
| 10 | *001000100 |
| 9 | *001000010 |
| 8 | *00100011 |
| 7 | *0010011 |
| 6 | *0000011 |
| 5 | *000111 |
| 4 | *00101 |
| 3 | *00001 |
| 2 | *011 |
| 1 | *111 |
| 0 | *10 |
| −1 | *110 |
| −2 | *010 |

TABLE 1-continued

| Dif. value | Code |
| --- | --- |
| −3 | *0011 |
| −4 | *00010 |
| −5 | *000110 |
| −6 | *0000010 |
| −7 | *0010010 |
| −8 | *00100000 |
| −9 | *001000011 |
| −10 | *001000101 |
| others | *0000001 |

As for the main image signal components xij, where i, j=1, 2, ..., which correspond to each group, a calculation is made to find the value of the difference between the value of the image signal component xi,j+1, representing each picture element and the value of the image signal component xi,j representing the picture element, which is located immediately before each said picture element. The calculations are carried out with Formula (7)

$$\Delta xi,j+1 = xi,j+1 - xij \quad (7)$$

In this manner, difference image signal components $\Delta xi,j+1$, where i, j=1, 2, ..., are generated, which represent the values of the differences thus calculated. The values of the difference image signal components $\Delta xi,j+1$, where i, j=1, 2, ..., are encoded into Huffman codes. In general, neighboring picture elements in an image have strong correlation to one another. Therefore, in many cases, the values of the difference image signal components $\Delta xi,j+1$, where i, j=1, 2, ..., which have been calculated from Formula (7), are close to zero. Accordingly, by encoding the values of the difference image signal components $\Delta xi,j+1$, where i, j=1, 2, ..., into the Huffman codes, the amount of the signal can be reduced. In this manner, as for the main image signal components xij, where i, j=1, 2, ..., a series of the main image signal components corresponding to each group are generated, which are constituted of the main image and the difference image signal components $\Delta xi,j+1$, where i, j=1, 2, ..., which have been encoded into the Huffman codes and correspond to the next and following main image signal components xi,j+1, where i, j=1, 2, ... In this embodiment, a series of the main image signal components, which are obtained ultimately and correspond to each group, correspond to a series of the primary compressed image signal components, which correspond to each block, in the first method for storing an image signal in accordance with the present invention. Also, a series of the interpolated image signal components, which are obtained ultimately and correspond to each group, correspond to a series of the secondary compressed image signal components, which correspond to each block, in the first method for storing an image signal in accordance with the present invention.

After a plurality of series of the main image signal components and a plurality of series of the interpolated image signal components are generated in the manner described above, codes are attached to the top and/or the end of a series of the main image signal components, which correspond to each group, and to the top and/or the end of a series of the interpolated image signal components, which correspond to each group.

Figure 3A:
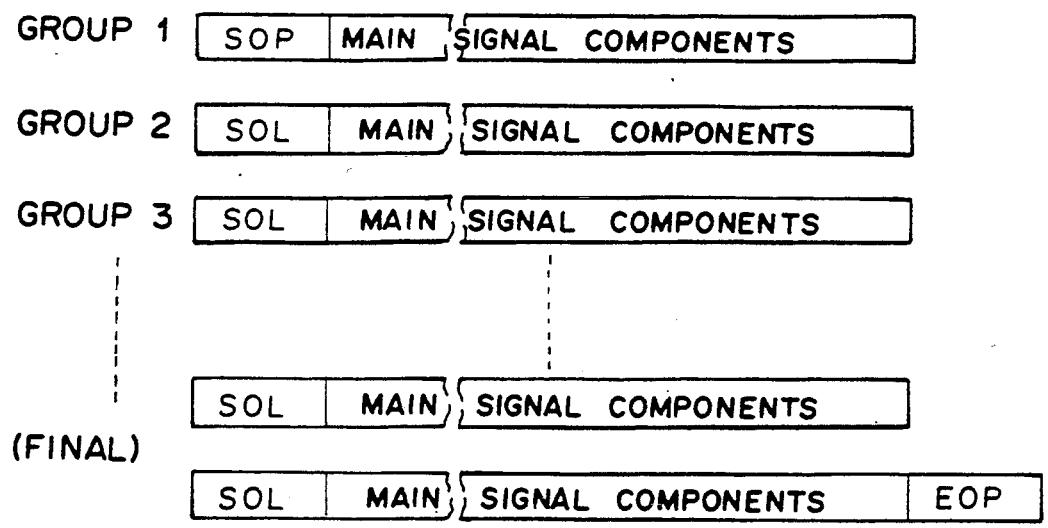
FIGS. 3A and 3B are explanatory views showing how a plurality of series of main image signal components and a plurality of series of interpolated image signal components are arrayed in the embodiment of the first method for storing an image signal in accordance with the present invention.
Figure 3B:
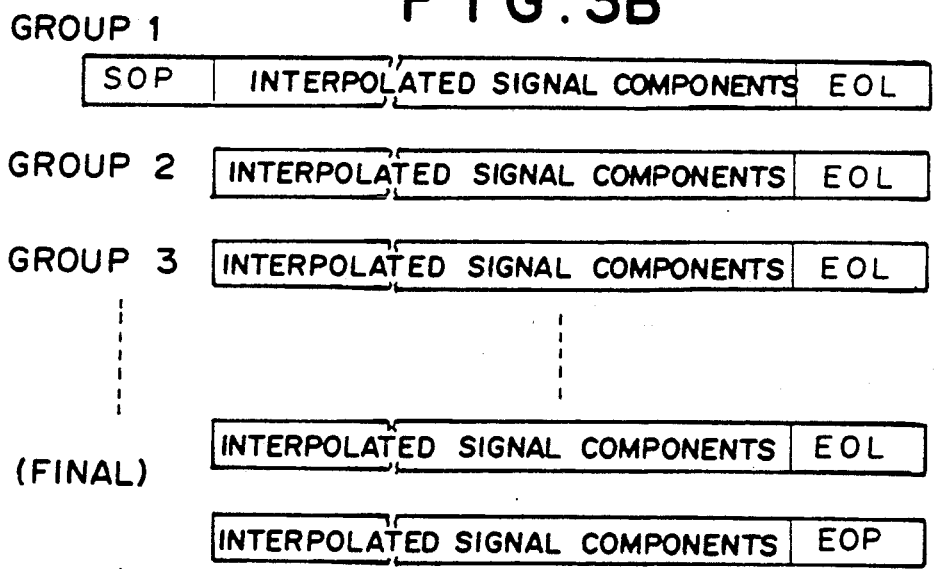

FIGS. 3A and 3B are explanatory views showing how a plurality of series of main image signal components and a plurality of series of interpolated image signal components are arrayed in the embodiment of the first method for storing an image signal in accordance with the present invention. FIGS. 4A, 4B, 4C, and 4D are explanatory views showing the bit strings, which constitutes codes attached to the tops or ends of a plurality of series of main image signal components and a plurality of series of interpolated image signal components in the embodiment of the first method for storing an image signal in accordance with the present invention.

As shown in FIG. 3A, a code SOP is attached to the top of a series of the main image signal components, which correspond to group 1. The code SOP is constituted of a bit string shown in FIG. 4C and represents that the image signal components corresponding to a single image start. Codes SOL are attached to the tops of the plurality of series of the main image signal components, which correspond to group 2 and those that follow. Each of the codes SOL represents that a series of the main image signal components, which correspond to each group, start. As illustrated in FIG. 4A, each of the codes SOL is composed of 17 consecutive bits, which have been set to 0 and represent a border of a series of the image signal components corresponding to each group, and bits representing a group number, which is assigned to each group for discriminating it from the other groups. Also, a code EOP is attached to the end of a series of the main image signal components, which correspond to the final group. The code EOP is constituted of a bit string shown in FIG. 4D and represents that the image signal components corresponding to a single image terminate.

As shown in FIG. 3B, a code SOP is attached to the top of a series of the interpolated image signal components, which correspond to group 1. The code SOP represents that the image signal components corresponding to a single image start. Also, a code EOP is attached to the end of a series of the interpolated image signal components, which correspond to the final group. The code EOP represents that the image signal components corresponding to a single image terminate. Additionally, codes EOL are attached to the ends of the plurality of series of the interpolated image signal components, which correspond to the groups other than the final group. Each of the codes EOL represents that a series of the interpolated image signal components, which correspond to each group, terminate. As illustrated in FIG. 4B, each of the codes EOL is composed of 17 consecutive bits, which have been set to 0 and represent a border of a series of the image signal components corresponding to each group, and bits representing a group number, which is assigned to each group for discriminating it from the other groups.

Therefore, from the codes SOP, SOL, EOL, and EOP attached to the series of the main image signal components and the series of the interpolated image signal components, it can be found which series of the main image signal components and which series of the interpolated image signal components correspond to each other and belong to which group.

In the manner descried above, the main image signal components and the interpolated image signal components are compressed independently of each other, and codes are attached to the respective groups of the main image signal components, which have been compressed, and the respective groups of the interpolated image signal components, which have been compressed. Thereafter, an array of a plurality of the series of the main image signal components, which is shown in FIG. 3A, and an array of a plurality of the series of the interpolated image signal components, which is shown in FIG. 3B, are stored independently of each other on the optical disk 67.

FIG. 5 is an explanatory view showing an example of the recording format on the optical disk 67. How the main image signal components and the interpolated image signal components, which have been obtained in the manner described above, and the retrieval information, such as the patient information S2 and the image characteristics information S3, are recorded on the optical disk 67 will hereinbelow be described in detail with reference to FIG. 5. The signal composed of the main image signal components and the interpolated image signal components will hereinbelow be referred to as a compressed image signal S5.

In FIG. 5, each graduation along the vertical axis indicates a single track on the optical disk 67, and each graduation along the horizontal axis indicates a single sector. Compressed image signals S5, S5, . . . are recorded in units of a single image in an image signal recording region 80, which is sufficiently broadly formed on the optical disk 67. Specifically, the array of the plurality of the series of the main image signal components shown in FIG. 3A and the array of the plurality of the series of the interpolated image signal components shown in FIG. 3B, which arrays constitute a single compressed image signal S5, are stored in this order in the image signal recording region 80. A header 81A and blocks 81B and 81C are located before and after an image signal area 81, in which a compressed image signal S5 corresponding to a single image is recorded. The retrieval information, such as the patient information S2 and the image characteristics information S3, corresponding to a compressed image signal S5, which corresponds to a single image and which is recorded in the image signal area 81, is recorded in the header 81A. The information S4 about the image processing conditions, which are to be used in the image processing unit 30, is recorded in the blocks 81B and 81C.

When a single compressed image signal S5 has been recorded in the image signal area 81 on the optical disk 67 in the manner described above, one of the image directories 83A, 83B, 83C, . . . that corresponds to the compressed image signal S5, which has been recorded in the image signal area 81, is recorded in an image directory region 82. Basically, in each of the image directories 83A, 83B, 83C, . . . , the head address of the header 81A for the compressed image signal S5, which has been recorded in the image signal area 81, the sector length of the compressed image signal S5, and characteristic information about the compressed image signal S5 are recorded.

The optical disk 67 is also provided with a region 84 for forming substitution directories 89A, 89B, 89C, . . . , which are used for substitution of the image directories 83A, 83B, 83C, . . . when they are changed. The optical disk 67 is further provided with a region 85 for forming directories corresponding to new retrieval information, or the like. Also, blocks 86 and 87 and a plurality of directory entry blocks 88A, 88B, 88C, . . . are formed on the first track of the optical disk 67. In the block 86, information about the serial number of each disk and an identification code for identifying the surface (surface A or B) of each disk are recorded. The block 87 is used to indicate that the optical disk 67 has filled with information and cannot record information any more. The first directory entry block 88A is used for indicating that a group of the image directories 83A, 83B, 83C, . . . has been formed. The head address and the sector length of the image directory group (i.e. the group of directories formed in the image directory region 82) are recorded in the first directory entry block 88A. In the second directory entry block 88B, the head address and the sector length of the substitution directory group (89A, 89B, 89C, . . . ) are recorded. Also, the third directory entry block 88C and the subsequent directory entry blocks are formed for recording head addresses and sector lengths of directory groups for the future.

In the manner described above, the compressed image signals S5, S5, . . . and the information accompanying the compressed image signals S5, S5, . . . (such as the patient information S2, the image characteristics information S3, and the information S4 about the image processing conditions) are sequentially recorded in units of a single image on the optical disk 67. In cases where image signals are compressed and the resulting compressed image signals S5, S5, . . . are thus stored on the optical disk 67, image signals corresponding to a larger number of images can be filed on the optical disk 67 than when image signals, which have not been compressed, are stored on the optical disk 67. For example, image signals representing approximately 1,000 images can be filed on a single optical disk 67. On the other hand, the recording capacity of the fixed magnetic disk 65 is smaller than the recording capacity of the optical disk 67. However, only the data base composed of the retrieval information, such as the patient information S2 and the image characteristics information S3, is recorded on the fixed magnetic disk 65. Therefore, by way of example, the retrieval information corresponding to approximately 1,000,000 images can be filed on the fixed magnetic disk 65.

How an image signal is retrieved and a visible image is reproduced from the retrieved image signal will now be described below.

An operator operates the keyboard 61A to enter the desired retrieval information, using the display unit 61B of the operating console 61. Basically, as the retrieval information, all items of the patient information S2 and the image characteristics information S3 can be used. The system control device 51 retrieves a single image signal or a plurality of image signals corresponding to the entered retrieval information by utilizing the data base constructed on the magnetic disk 65, and displays a list of the image signals on the display unit 61B. For example, when the name of a patient, which is one item of the patient information S2, is designated as the retrieval information, an image signal list is displayed on the display unit 61B, which image signal list indicates the image signal numbers of all images of the designated patient, the patient information S2 other than the name of the patient, and the image characteristics information S3. The operator selects a desired image signal from the displayed image signal list. When the image signal is thus selected, the system control device 51 activates the optical disk device 52 to read the selected image signal from the optical disk 67. In the course of reading the selected image signal from the optical disk 67, an instruction designating the reading of the image directory group in the region 82 is given with the first directory entry block 88A acting as a pointer, and the image directories 83A, 83B, 83C, . . . are read out. Also, one of the image directories 83A, 83B, 83C, . . . , in which the selected image signal number is written, acts as a pointer, and the header 81A indicated by said image directory is designated. In this manner, the information written in the header 81A, the compressed image signal S5 written in the image signal area 81, and the information written in the blocks 81B and 81C corresponding to the header 81A are read out.

The compressed image signal S5 in the image signal area 81, the patient information S2 and the image characteristics information S3 in the header 81A, and the information S4 about the image processing conditions in the blocks 81B and 81C, which have been read out in the manner described above, are transferred from the system control device 51 to the image processing unit 30. In the image processing unit 30, the tops of the respective series of the main image signal components corresponding to the respective groups are searched from the compressed image signal S5. Thereafter, the main image signal components corresponding to each group are decoded from the Huffman codes and subjected to decompression processing, which corresponds to the reversed operation of the compression processing expressed as Formula (7). Specifically, the decompression processing is carried out with the formula $$x_{i,j+1} = x_{ij} + \Delta x_{i,j+1} \qquad (8)$$

In this manner, the main image signal components, which have not been compressed, are restored.

Thereafter, how the plurality of the series of the main image signal components and the plurality of the series of the interpolated image signal components are associated with each other is found with reference to the codes SOP, SOL, EOL, and EOP. The interpolated values $a_{ij}'$, $b_{ij}'$, and $c_{ij}'$, where $i, j = 1, 2, \ldots$, are calculated from the values of the main image signal components. The calculations are carried out with Formulas (1), (2), and (3). The interpolated image signal components are decoded from the Huffman codes and subjected to decompression processing, which corresponds to the reversed operation of the compression processing expressed as Formulas (4), (5), and (6). Specifically, the decompression processing is carried out with the formula $$a_{ij} = \Delta a_{ij} + a_{ij}' \qquad (9)$$

$$b_{ij} = \Delta b_{ij} + b_{ij}' \qquad (10)$$

$$c_{ij} = \Delta c_{ij} + c_{ij}' \qquad (11)$$

In this manner, the interpolated image signal components, which have not been compressed, are restored. The original image signal S1 can then be reconstructed by combining the main image signal components and the interpolated image signal components, which have been restored in the manner described above.

Thereafter, the image processing unit 30 carries out image processing, such as gradation processing or frequency response processing, on the image signal S1 under the image processing conditions represented by the information S4. The image processing unit 30 feeds an image signal S1', which is obtained from the image processing, into the image reproducing apparatus 70. The image reproducing apparatus 70 reproduces a visible image from the processed image signal S1' and displays it on the CRT display screen.

With a conventional technique, in cases where part of the compressed image signal S5, which has been read from the optical disk 67, has been destroyed due to, for example, defects of the optical disk 67, it could not be found how many series of the main image signal components or the interpolated image signal components have been destroyed. Therefore, the destroyed part of the compressed image signal S5 and the image signal components that follow the destroyed part could not heretofore been restored normally. On the other hand, with this embodiment, as shown in FIGS. 3A and 3B, the codes SOP, SOL, EOL, and EOP are attached to the series of the main image signal components and the series of the interpolated image signal components. The plurality of series of the main image signal components and the plurality of the series of the interpolated image signal components are then stored on the optical disk 67. Therefore, in cases where part of the compressed image signal S5, which has been read from the optical disk 67, has been destroyed, it can be found how many series of the main image signal components or the interpolated image signal components have been destroyed. Accordingly, the image signal components that follow the destroyed part can be restored normally, and no serious problems occur in the course of carrying out the image processing, or the like, that follow the decompression processing.

An embodiment of the second method for storing an image signal in accordance with the present invention will be described hereinbelow. This embodiment is employed in the image read-out, filing, and reproducing system shown in FIG. 1.

In this embodiment, the image signal S1 is compressed in the image processing unit 30 in the manner described below.

Figure 6:
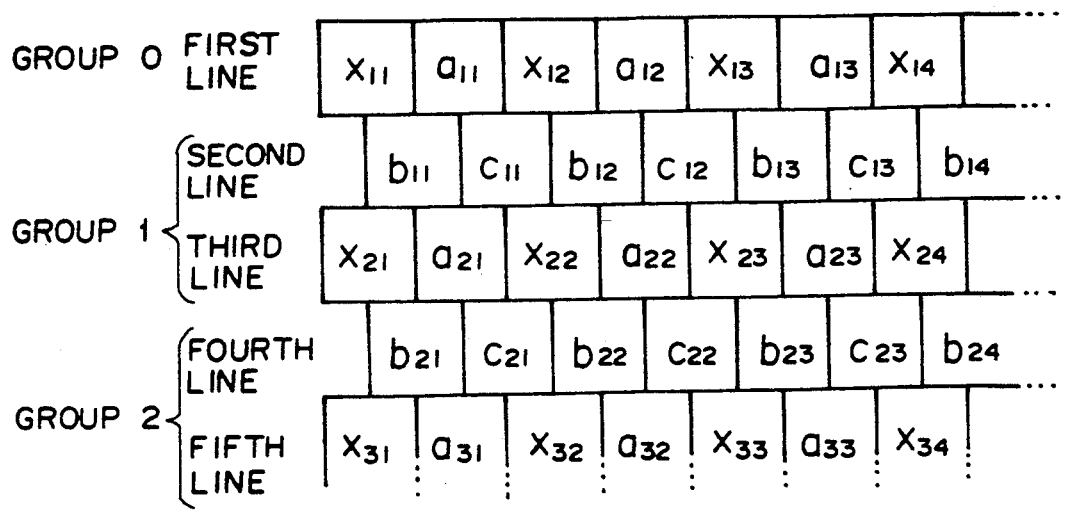
FIG. 6 is an explanatory view showing how picture elements in an image are arrayed.

FIG. 6 is an explanatory view showing how picture elements in an image are arrayed. As in FIG. 2, as an aid in facilitating the explanation, reference characters $x_{ij}$, $a_{ij}$, $b_{ij}$, and $c_{ij}$, where $i, j = 1, 2, \ldots$, are used herein to denote both the picture elements and the image signal components representing the picture elements.

In this embodiment, as shown in FIG. 6, the image signal components representing the picture elements, which are arrayed along the first line, are classified as group 0. As for the other lines, every two lines are combined into a single group. In this embodiment, the groups correspond to the blocks in the second method for storing an image signal in accordance with the present invention.

In the same manner as that in the aforesaid embodiment of the first method for storing an image signal in accordance with the present invention, the difference image signal components $\Delta a_{ij}$, $\Delta b_{ij}$, and $\Delta c_{ij}$, where $i, j = 1, 2, \ldots$, which correspond to each group, are calculated with Formulas (1) through (6) and then encoded into the Huffman codes. The difference image signal components, which have thus been encoded into the Huffman codes, are employed as a series of interpolated image signal components. Also, in the same manner as that in the aforesaid embodiment of the first method for storing an image signal in accordance with the present invention, as for the main image signal components $x_{ij}$, where $i, j = 1, 2, \ldots$, a series of the main image signal components corresponding to each group are generated, which are constituted of the main image signal component $x_{i,j}$, located at the top of each group, and the difference image signal components $\Delta x_{i,j+1}$, where $i, j = 1, 2, \ldots$, which have been encoded into the Huffman codes and correspond to the next and following main image signal components xi,j+1, where i, j=1, 2, ... In this embodiment, a series of the main image signal components, which are obtained ultimately and correspond to each group, correspond to a series of the primary compressed image signal components, which correspond to each block, accordance with the present invention. Also, a series of the interpolated image signal components, which are obtained ultimately and correspond to each group, correspond to a series of the secondary compressed image signal components, which correspond to each block, in the second method for storing an image signal in accordance with the present invention.

FIG. 7 is an explanatory view showing how a plurality of series of main image signal components and a plurality of series of interpolated image signal components are arrayed in the embodiment of the second method for storing an image signal in accordance with the present invention. FIGS. 8A, 8B, 8C, and 8D are explanatory views showing the bit strings, which constitutes codes attached to the tops and ends of a plurality of series of main image signal components and the end of a last series of interpolated image signal components in the embodiment of the second method for storing an image signal in accordance with the present invention.

As shown in FIG. 7, a code SOP is attached to the top of a series of the main image signal components, which correspond to group 0. The code SOP is constituted of a bit string shown in FIG. 8C and represents that the image signal components corresponding to a single image start. Codes SOL are attached to the tops of the plurality of series of the main image signal components, which correspond to group 1 and those that follow. Each of the codes SOL represents that a series of the main image signal components, which correspond to each group, start. As illustrated in FIG. 8A, each of the codes SOL is composed of 17 consecutive bits, which have been set to 0 and represent a border of a series of the image signal components corresponding to each group, and bits representing a group number, which is assigned to each group for discriminating it from the other groups. Codes EOL are attached to the ends of the plurality of series of the main image signal components, which correspond to group 1 and those that follow. Each of the codes EOL is constituted of a bit string shown in FIG. 8B and represents that a series of the main image signal components, which correspond to each group, terminate. Each of the codes EOL also represents the boundary between a series of the main image signal components, which correspond to each group, and a series of the interpolated image signal components, which correspond to the same group as said series of the main image signal components. No code is attached to the plurality of the series of the interpolated image signal components, except for the final group n. Each series of the interpolated image signal components are sandwiched between a series of the main image signal components, which correspond to the same group as each said series of the interpolated image signal components, and a series of the main image signal components, which correspond to the next group. Therefore, each series of the interpolated image signal components are sandwiched between the code EOL attached to the end of a series of the main image signal components, which correspond to the same group as each said series of the interpolated image signal components, and the code SOL attached to the top of a series of the main image signal components, which correspond to the next group. Accordingly, the top and the end of each series of the interpolated image signal components can be found from the codes EOL and SOL. A code EOP is attached to the end of a series of the interpolated image signal components, which correspond to the final group n. The code EOP is constituted of a bit string shown in FIG. 8D and represents that the image signal components corresponding to a single image terminate.

In the manner descried above, the main image signal components and the interpolated image signal components are compressed independently of each other, and codes are attached to the respective groups of the main image signal components, which have been compressed, and the respective groups of the interpolated image signal components, which have been compressed. Thereafter, a plurality of the series of the main image signal components a plurality of the series of the interpolated image signal components are arrayed in the manner shown in FIG. 7 and stored in the array shown in FIG. 7 on the optical disk 67.

In accordance with the recording format shown in FIG. 5, the compressed image signal S5 composed of the main image signal components and the interpolated image signal components, which have been obtained in the manner described above and arrayed in the manner shown in FIG. 7, and the retrieval information, such as the patient information S2 and the image characteristics information S3, are recorded on the optical disk 67. Compressed image signals S5, S5, . . . are recorded in units of a single image and in the array shown in FIG. 7 in the image signal recording region 80, which is sufficiently broadly formed on the optical disk 67.

In the course of retrieving an image signal and reproducing a visible image from the retrieved image signal, the compressed image signal S5 in the image signal area 81, the patient information S2 and the image characteristics information S3 in the header 81A, and the information S4 about the image processing conditions in the blocks 81B and 81C are read out from the optical disk 67 in the same manner as that described above with reference to FIGS. 1 and 5. The compressed image signal S5 and the information thus read from the optical disk 67 ar transferred from the system control device 51 to the image processing unit 30. In the image processing unit 30, the tops of the respective series of the main image signal components corresponding to the respective groups are searched from the compressed image signal S5. Thereafter, the main image signal components corresponding to each group are decoded from the Huffman codes and subjected to decompression processing, which corresponds to the reversed operation of the compression processing expressed as Formula (7). Specifically, the decompression processing is carried out with Formula (8). In this manner, the main image signal components, which have not been compressed, are restored.

Thereafter, the interpolated values $aij'$, $bij'$, and $cij'$, where i, j=1, 2, . . . , are calculated from the values of the main image signal components. The calculations are carried out with Formulas (1), (2), and (3). The interpolated image signal components are decoded from the Huffman codes and subjected to decompression processing, which corresponds to the reversed operation of the compression processing expressed as Formulas (4), (5), and (6). Specifically, the decompression processing is carried out with Formulas (9), (10), and (11). In this manner, the interpolated image signal components, which have not been compressed, are restored. The original image signal S1 can then be reconstructed by combining the main image signal components and the interpolated image signal components, which have been restored in the manner described above.

With this embodiment, as shown in FIG. 7, a series of the main image signal components and a series of the interpolated image signal components, which belong to the same group, are located close to each other. Also, a group number is attached to the top of each group. Therefore, in cases where part of the compressed image signal S5, which has been read from the optical disk 67, has been destroyed, it can be found how many groups of the image signal components have been destroyed. Accordingly, the image signal components that follow the destroyed part can be restored normally, and no serious problems occur in the course of carrying out the image processing, or the like, that follow the decompression processing.

In the aforesaid embodiments of the first and second methods for storing an image signal in accordance with the present invention, image signals representing medical radiation images are filed. However, the first and second methods for storing an image signal in accordance with the present invention are also applicable when image signals representing other kinds of medical images, such as CT images and MR images, and general types of images other than medical images are stored.

What is claimed is:

1. A method for storing an image signal, which comprises the steps of:
   i) classifying a series of image signal components of an image signal, which have been detected by scanning an image in a main scanning direction and a sub-scanning direction and represent a plurality of picture elements in the image, into a plurality of blocks each of which is composed of the image signal components representing the picture elements arrayed along a single main scanning line or a plurality of main scanning lines,
   ii) for each of the plurality of the blocks, generating the primary compressed image signal components, which are obtained from the image signal components corresponding to each block, and secondary compressed image signal components, which are obtained from the primary compressed image signal components and the image signal components corresponding to each block, and
   iii) storing the primary compressed image signal components and the secondary compressed image signal components, which have been generated for the plurality of the blocks, on a storage medium,
   wherein an improvement comprises the steps of:
   a) attaching control codes at least to an edge of a series of the primary compressed image signal components, which correspond to each said block, and to an edge of a series of the secondary compressed image signal components, which correspond to the series of said primary compressed image signal components, said control codes representing that the series of said primary compressed image signal components and the series of said secondary compressed image signal components correspond to each other, and
   b) storing an array of a plurality of series of the primary compressed image signal components, which correspond to a whole image, and an array of a plurality of series of the secondary compressed image signal components, which correspond to the whole image, independently of each other.

2. A method as defined in claim 1 wherein said primary compressed image signal components and said secondary compressed image signal components are main image signal components and interpolated image signal components, which are generated during an interpolation encoding process.

3. A method as defined in claim 1 wherein said image is a medical image.

4. A method as defined in claim 1 wherein said image is a radiation image.

5. A method as defined in claim 4 wherein said radiation image is stored on a stimulable phosphor sheet, and an image signal representing said radiation image is obtained by exposing the stimulable phosphor sheet to stimulating rays, which cause it to emit light in proportion to the amount of energy stored thereon during its exposure to radiation, and photoelectrically detecting the emitted light.

6. A method as defined in claim 5 wherein said stimulating rays are a laser beam.

7. A method for storing an image signal, which comprises the steps of:
   i) classifying a series of image signal components of an image signal, which have been detected by scanning an image in a main scanning direction and a sub-scanning direction and represent a plurality of picture elements in the image, into a plurality of blocks each of which is composed of the image signal components representing the picture elements arrayed along a single main scanning line or a plurality of main scanning lines,
   ii) for each of the plurality of the blocks, generating primary compressed image signal components, which are obtained from the image signal components corresponding to each block, and secondary compressed image signal components, which are obtained from the primary compressed image signal components and the image signal components corresponding to each block, and
   iii) storing the primary compressed image signal components and the secondary compressed image signal components, which have been generated for the plurality of the blocks, on a storage medium,
   wherein an improvement comprises the steps of:
   a) attaching a first control code to a of a series of the primary compressed image signal components, which correspond to each said block, said first control code being used to discriminate the series of said primary compressed image signal components from other series of the primary compressed image signal components,
   b) attaching a second control code to an of a series of the primary compressed image signal components, which correspond to each said block, said second control code representing that the series of said primary compressed image signal components, which correspond to each said block, terminate, and
   c) storing the primary compressed image signal components and the secondary compressed image signal components on a storage medium such that a series of the secondary compressed image signal components, which correspond to a series of the primary compressed image signal components recorded immediately before a second control code, are located after said second control code.

8. A method as defined in claim 7 wherein said primary compressed image signal components and said secondary compressed image signal components are main image signal components and interpolated image signal components, which are generated during an interpolation encoding process.

9. A method as defined in claim 7 wherein said image is a medical image.

10. A method as defined in claim 7 wherein said image is a radiation image.

11. A method as defined in claim 10 wherein said radiation image is stored on a stimulable phosphor sheet, and an image signal representing said radiation image is obtained by exposing the stimulable phosphor sheet to stimulating rays, which cause it to emit light in proportion to the amount of energy stored thereon during its exposure to radiation detecting, and photoelectrically detecting the emitted light.

12. A method as defined in claim 11 wherein said stimulating rays are a laser beam.

* * * * *